United States Patent

Arzberger et al.

[11] Patent Number: 5,964,305
[45] Date of Patent: Oct. 12, 1999

[54] TRENCH WALL CUTTER

[75] Inventors: Maximilian Arzberger, Igenhausen; Ignaz Seitle, Karlshuld, both of Germany

[73] Assignee: Bauer Spezialtiafbau GmbH, Schrobenhausen, Germany

[21] Appl. No.: 08/985,868

[22] Filed: Dec. 5, 1997

[30] Foreign Application Priority Data

Dec. 13, 1996 [DE] Germany ............................ 196 52 022

[51] Int. Cl.[6] ................................ E21B 4/16; E21D 9/10
[52] U.S. Cl. ................................................ 175/91; 299/31
[58] Field of Search ................................ 175/91, 96, 101, 175/104; 299/31, 75

[56] References Cited

U.S. PATENT DOCUMENTS

| | | | |
|---|---|---|---|
| 4,312,541 | 1/1982 | Spurgeon | 299/31 |
| 4,548,442 | 10/1985 | Sugden et al. | 299/31 X |
| 4,694,915 | 9/1987 | Bauer et al. | |
| 5,035,071 | 7/1991 | Stotzer et al. | 299/86 X |
| 5,192,115 | 3/1993 | Hartman et al. | 299/31 |
| 5,192,116 | 3/1993 | Turner et al. | 299/75 |
| 5,234,257 | 8/1993 | Sugden et al. | 299/10 |

*Primary Examiner*—Frank Tsay
*Attorney, Agent, or Firm*—Sixbey, Friedman, Leedom & Ferguson; David S. Safran; Donald R. Studebaker

[57] ABSTRACT

A trench wall cutter with a drive mechanism which is attached to the cutting frame in a position which is spaced away from the bearing shield with a gear for driving at least one cutting wheel is provided. Between the drive mechanism and the drive pinion of the gear in the bearing shield there is a drive shaft. To reduce wear on the drive shaft bearing and gear wheel in the gear an external spiral tooth system is formed on one end of the drive shaft which fits into a connecting sleeve with an internal tooth system. In the internal tooth system the drive shaft with its external spiral tooth system is held rotationally fixed with the capacity to be deflected around the axis of the drive shaft. The connecting sleeve is also joined to the drive mechanism or drive pinion of the gear.

11 Claims, 3 Drawing Sheets

TRENCH WALL CUTTER

BACKGROUND OF THE INVENTION

1. Field of the Invention

The present invention relates to a trench wall cutter. Particularly, the present invention is directed to a trench wall cutter wherein a deflecting of the drive shaft is permitted such that coaxial deviations between the upper and lower bearings of the cutter can be accommodated.

2. Description of the Related Art

A known trench wall cutter of this type is set forth in U.S. Pat. No. 4,694,914 issued to Bauer et al. By moving the drive mechanism out of the bearing shield to a location on the cutting frame which is spaced away from the cutting wheels, an especially compact trench wall cutter is formed. This structure is suitable for producing narrow trench walls.

During operation of this trench wall cutter the entire drive mechanism is exposed to major stress, wear of the gear is intensified as is wear of the bearing of the drive shaft between the drive mechanism and the gear. Therefore, the trench wall cutter must necessarily be maintained at regular intervals.

SUMMARY OF THE INVENTION

The primary object of the present invention is to provide a trench wall cutter, wherein costs associated with maintenance of the cutter are reduced.

This object as well as others are achieved by providing a trench wall cutter wherein one end of the drive shaft includes an external spiral tooth system. A connection sleeve with an internal tooth system into which the drive shaft with its external spiral tooth system is received and is rotationally fixed therein is provided with the ability to be deflected around the drive shaft axis. The connecting sleeve is further joined in a rotationally fixed manner to the drive mechanism or the drive pinion.

The arrangement of the present invention forms a connection to the drive shaft in which a certain deflection of the drive shaft around its longitudinal axis is possible. Thus the drive shaft rolls on crown edges of its external spiral tooth system in the internal tooth system of the connecting sleeve. This mobility of the drive shaft between the cutting wheels and the drive mechanism located remote from the cutting wheels compensates for the twisting action which is inevitable during the operation of a trench wall cutter. Production-induced deviations from coaxialness of the upper and lower bearing of the shaft are likewise balanced. In this way transverse forces on the radial bearings, especially of the drive pinion, and the occurrence of undesirable forces in a gear-side plug connection are largely prevented. The trench wall cutter of the present invention is thus less subject to wear and is thus more easily maintained.

The arrangement of the present invention of an external spiral tooth system which is received by a connecting sleeve can be provided either between the drive shaft and the drive pinion or between the drive shaft and the drive mechanism.

In one preferred embodiment of the present invention, both ends of the drive shaft include an external spiral tooth system and a connecting sleeve, of which one is joined to the drive pinion and one to the drive mechanism. This double movable support of the drive shaft on its two ends provides beneficial compensation of impacts and twists. In the arrangement of the present invention, a clutch is omitted on the drive side of the drive shaft which with prior art trench wall cutters had been necessary to avoid positional overdetermination between the drive mechanism and the drive shaft. The elimination of the clutch with its relatively great mass and direct connection of the drive shaft to the drive outlet has a beneficial effect on the moment of inertia of the drive shaft.

According to another embodiment of the present invention, the internal tooth system is formed along the entire length of the connection sleeve and there is a connecting journal with a correspondingly formed external spiral tooth system which projects on the side facing away from the drive shaft into the connecting sleeve and which is rotationally fixed thereto. This connecting journal can be produced as a separate part which can be matched on the one hand to the internal tooth system of the connection sleeve and on the other hand to the drive pinion or an output shaft of the drive motor.

Since in particular motor drives represent external parts with a given output shaft, it is advantageous for there to be a connecting journal which is rotationally fixed to the drive mechanism.

According to another embodiment of the present invention, it is advantageous for there to be a connecting journal which is rotationally fixed to the drive pinion. In particular, connecting journals can be provided both on the drive pinion and also on the drive mechanism.

One preferred development of the invention lies in that the connecting journal joined to the drive pinion on its face away from the drive pinion has a recessed support surface which cooperates with a spherical cap on the bearing shield-side end of the drive shaft such that the spherical cap rests on the support surface of the connecting journal. In the operating position of the trench wall cutter the drive shaft extends essentially vertically upward away from the cutting wheels. In this position the drive shaft lies with its face-side, partially spherical cap on the support surface of the connecting journal on the drive pinion, so that in this way all the axial force is accommodated by the support surface. There is no need for any additional axial bearings with this arrangement.

In order to accurately fix the position of the drive shaft, the connecting journal is provided with a means for axially fixing the location of the connecting journal on the connecting sleeve.

Finally, one preferred embodiment on the present invention provides an elastic element between the connecting journal of the drive mechanism and the adjacent end of the drive shaft. The elastic element is used to define the position of the drive shaft. The elasticity of the elastic element furthermore allows a certain deflection capacity of the drive shaft. At the same time the elastic element is used to dampen impacts between the drive mechanism and the drive shaft.

These as well as additional advantages of the present invention will become apparent from the following description when read in light of the several figures.

DETAILED DESCRIPTION OF THE PREFERRED EMBODIMENT

Figure 1:
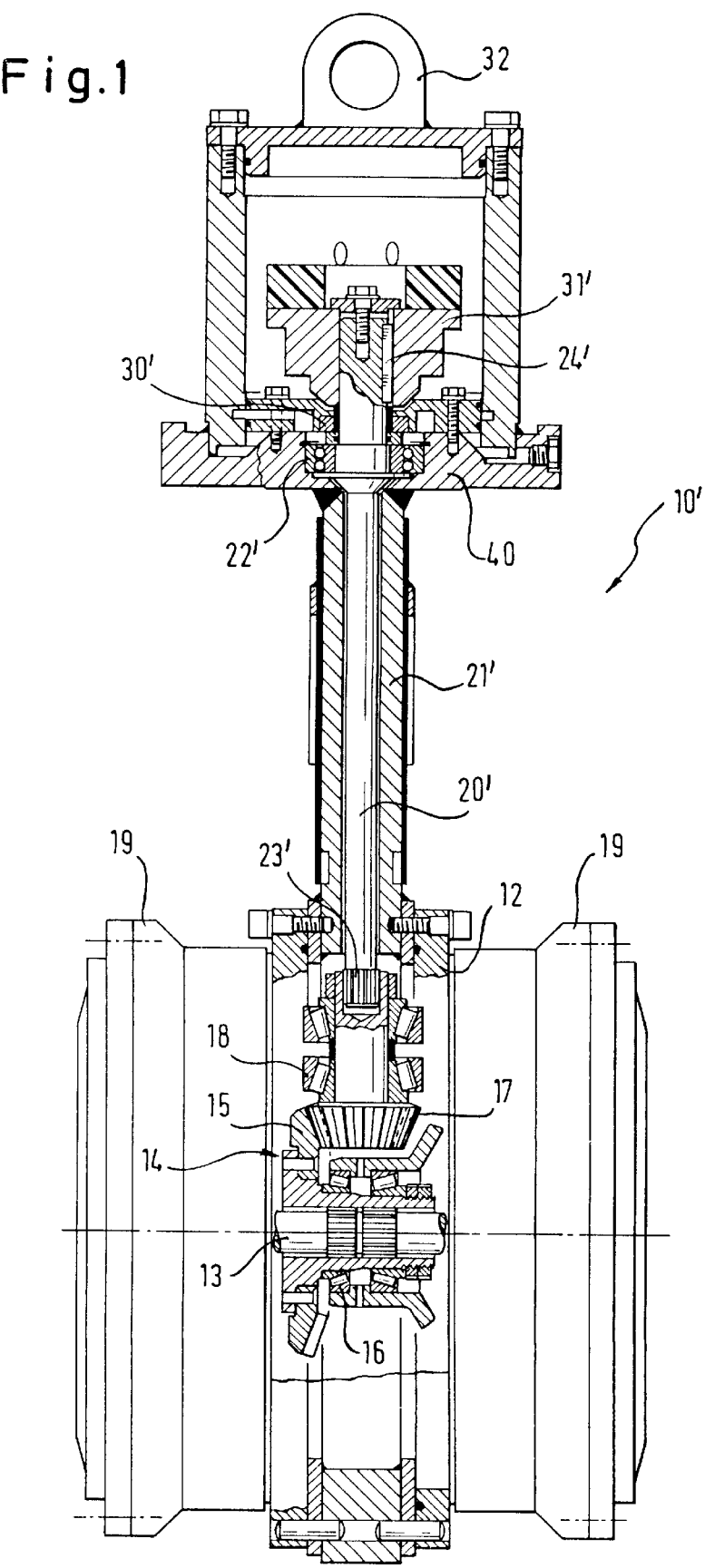
FIG. 1 shows a schematic partial cross sectional view of a trench wall cutter in accordance with the prior art.

FIG. 1 shows the basic structure of a trench wall cutter 10'. On bearing shield 12 are one pair of cutting wheel hubs 19 which are driven via a cutting wheel shaft 13. Cutting wheels (not shown) can be detachably mounted on the cutting wheel hubs 19. Within the bearing shield 12 which is composed of several plates is positioned bevel gear 14. The drive shaft 13 is joined to ring gear 15 which is pivotally secured to the bearing shield 12 via ring gear bearing 16. Ring gear 15 engages a drive pinion 17 with an axis of rotation which extends essentially perpendicular to the cutting wheel shaft 13. Drive pinion 17 in turn is rotationally mounted in bearing shield 12 via two pinion bearings 18.

To keep bearing shield 12 as compact as possible, the drive mechanism (not shown) is located above bearing shield 12 on cutting frame 40. The drive pinion 17 is joined via a first rotationally fixed connection 23' to drive shaft 20' which extends substantially coaxial to the drive pinion 17 to the top towards the drive mechanism. On the top end of drive shaft 20' which is surrounded in a liquid-tight manner by tube 21', there is second rotationally fixed connection 24' which, as is illustrated, is a key and slot connection. It is used for connection to coupling element 31' which transfers torque from the drive mechanism to drive shaft 20'. Drive shaft 20' is rotationally mounted via drive shaft bearing 22' on cutting frame 40 and is sealed in a liquid tight bearing housing 30. Finally, on cutting frame 40 there is a holder 32 via which the trench wall cutter 10' can be held and guided in a trench wall to be formed in the ground.

This known arrangement of the drive mechanism and cutting wheels in a trench wall cutter is advantageous with respect to formation of a bridge as narrow a possible between the cutting wheels. However, during operation relatively large forces act on the trench wall cutter and especially cutting frame 40, consequently, twisting and deformation of the cutting wheel frame 40 can occur. The resulting changes of position of the drive mechanism, drive shaft 20', and drive pinion 17 relative to another; however, leads to relatively high transverse forces in pinion bearings 18 and drive shaft bearing 22' and undesirable tooth forces in bevel gear 14. Such transverse forces result in increased wear of the bearings and gear wheels which leads to increased down time of the cutter as well as increased maintenance costs associated with the trench wall cutter.

Figure 2:
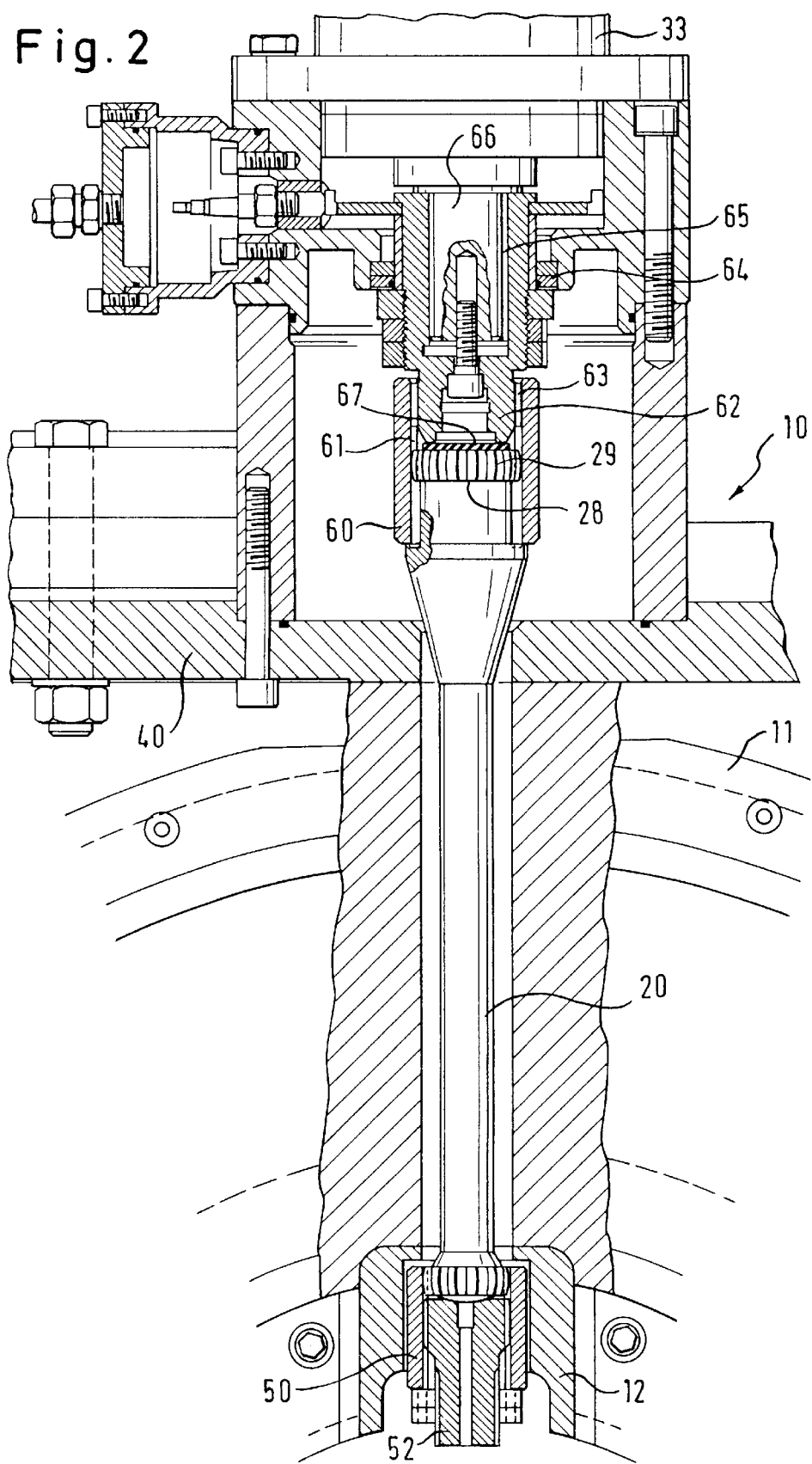
FIG. 2 shows a partial cross sectional view of a drive shaft of a trench wall cutter in accordance with the present invention.
Figure 3:
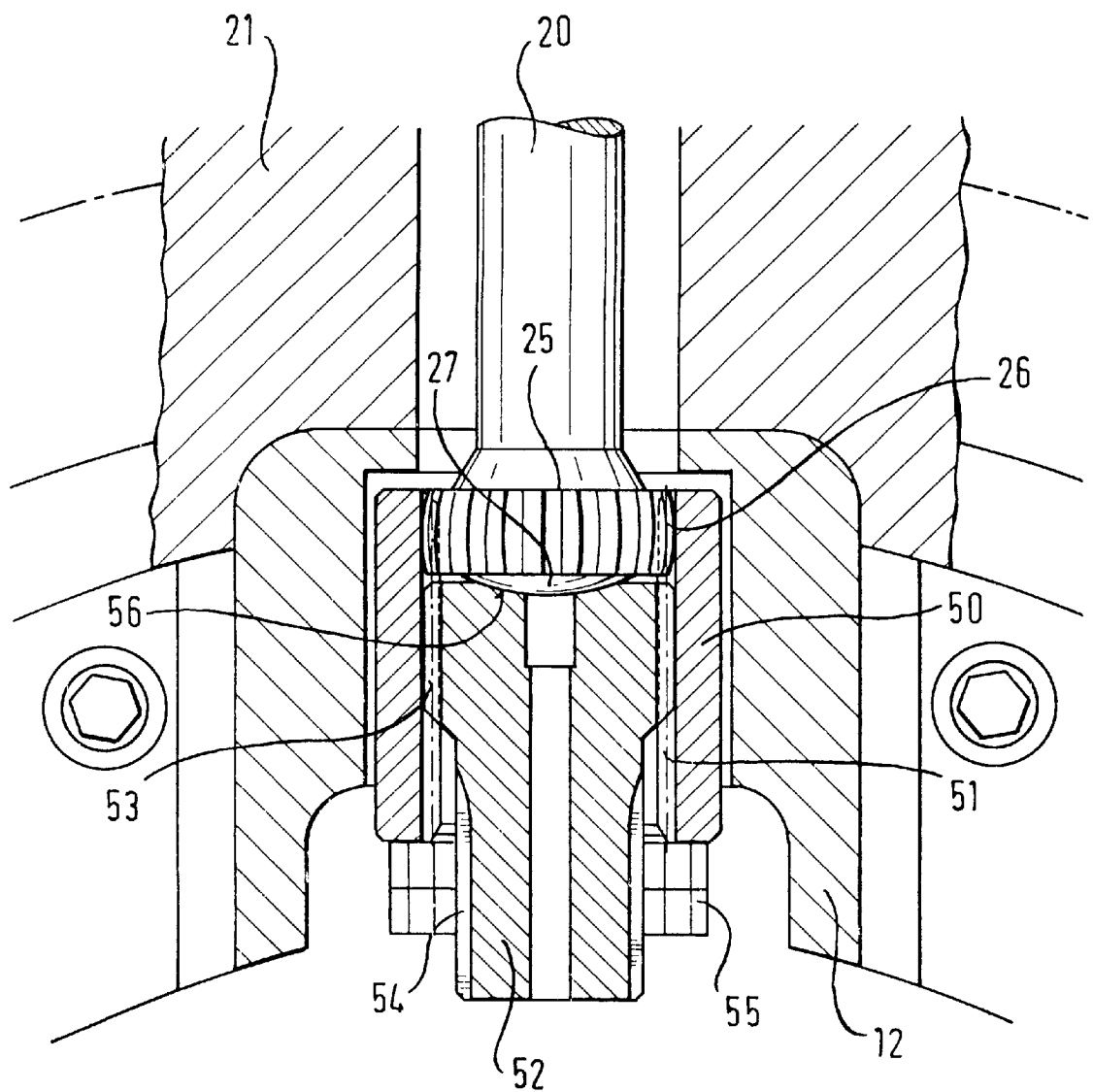
FIG. 3 shows an enlarged detailed view of a lower end of the drive shaft of FIG. 2.

The above-noted problems are avoided by trench wall cutter 10 in accordance with the present invention, of which sections are shown in FIGS. 2 and 3. The parts which are described in conjunction with FIG. 1 and which are labelled with a reference number without a prime mark can be provided essentially without change in trench wall cutter 10 of the invention.

To compensate for twists of cutting frame 40 relative to cutting wheels 11, the drive shaft 20 includes a shoulder 25 with an external spiral tooth system 26 on its lower end facing the bearing shield 12. The external spiral tooth system 26 is designed such that the drive shaft 20 can be received in an internal tooth system 51 of a first connecting sleeve 50 positioned about the axis of drive shaft 20. The outside edges of the individual teeth or projections of the external spiral tooth system 26 are crowned and are shaped according to a suitable generating cam. The maximum diameter of the outer profile of the external spiral tooth system 26 corresponds to the maximum inside diameter of the profile of the internal tooth system 51.

The internal tooth system 51 includes axially parallel profile edges extending along the entire inner surface of connecting sleeve 50. A first connecting journal 52 with external tooth system 53 having axially parallel profile edges extends into the opposing side of connecting sleeve 50 from the drive shaft 20. The opposing ends of the drive shaft 20 and the first connecting journal 52 are in contact with one another. To facilitate deflecting motion of the drive shaft 20, the contact surface is in the form of a spherical cap 27 which rests against a hardened support surface 56 which is formed to receive the spherical cap 27. An offset area of smaller diameter on the end of the first connecting journal 52 facing away from supporting surface 56 constitutes a plug-in connection 54 for drive pinion 17. Plug-in connection 54 can be a serrated connection or the like. The axial position of connecting sleeve 50 on first connecting journal 52 is fixed via ring-shaped safety device 55. The first connecting journal 50 on its end facing away from support surface 56 is further coupled to drive pinion 17 via a conventional rotationally fixed connection.

On the top end of drive shaft 20 in a similar manner as on the lower end there is second shoulder 28 having an external spiral tooth system 29. This external spiral tooth system 29 fits into correspondingly formed internal tooth system 61 of a second connecting sleeve 60 by form-fit in order to form with it a rotationally fixed connection which can be swivelled around the axis of drive shaft 20. From the other side of second connecting sleeve 60, a second connecting journal 62 fits into internal tooth system 61 to likewise form a rotationally fixed connection. Between the top end of drive shaft 20 and the opposite end of the second connecting pinion 62 there is an elastic element 65, for example, a rubber plate, by which a certain axial force is exerted for positioning of the drive shaft 20 without adversely affecting the deflection capacity of the drive shaft 20.

The second connecting journal 62 is in turn securely joined to a motor shaft 66 of the drive 33. Between the second connecting journal 62 and the housing on cutting frame 40 is seal 64. Bearing of the top connection is ensured by the bearing of motor shaft 66 in drive 33.

While the present invention has been described with reference to a preferred embodiment, it should be appreciated by those skilled in the art that the invention may be practiced otherwise than is specifically described herein without departing from the spirit and scope of the invention. It is, therefore, to be understood that the spirit and scope of the invention be limited only by the appended claims.

We claim:

1. A trench wall cutter comprising:
    a cutting frame,
    a bearing shield positioned on said cutting frame,
    at least one cutting wheel pivotally mounted on said bearing shield,
    a drive means for driving said at least one cutting wheel attached to the cutting frame remote from said bearing shield,
    a gear located in the bearing shield,
    a drive shaft connected at a first end to the drive means and at a second end to a drive pinion of the gear in the bearing shield, the pinion positioned substantially coaxially with said drive shaft, at least one of said first and second end of said drive shaft including an external spiral tooth system, and
    a connection sleeve including an internal tooth system into which said external spiral tooth system of said end of said drive shaft is received so as to be deflected around the drive shaft axis, with said connecting sleeve being joined to one of said drive means and said drive pinion.

2. The trench wall cutter as claimed in claim 1, wherein both ends of said drive shaft include external spiral tooth systems and a connecting sleeve, wherein one end is joined to the drive pinion and one end is joined to the drive means.

3. The trench wall cutter as claimed in claim 1, wherein the internal tooth system is formed along an entire length of said connecting sleeve.

4. The trench wall cutter as claimed in claim 3, further comprising a connecting journal having an external tooth system which projects from the side facing away from the drive shaft into the connecting sleeve and which is joined to said sleeve.

5. The trench wall cutter as claimed in claim 4, wherein said connecting journal is joined to said drive means.

6. The trench wall cutter as claimed in claim 4, wherein said connecting journal is joined to said drive pinion.

7. The trench wall cutter as claimed in claim 6, wherein said connecting journal joined to said drive pinion includes a recessed support surface on a face adjacent said drive shaft, and said drive shaft includes a spherical cap which rests on said support surface of the connecting journal.

8. The trench wall cutter as claimed in claim 7, wherein the connecting journal has means for axially fixing a location of the connecting journal on the connecting sleeve.

9. The trench wall cutter as claimed in claim 5, further comprising an elastic element positioned between said connecting journal joined to said drive means and an adjacent end of said drive shaft.

10. The trench wall cutter as claimed in claim 1, wherein a bearing shield-side face of said drive shaft is formed as a bearing surface, and said drive pinion includes a support surface which lies axially opposite said bearing surface such that said drive shaft with said bearing surface lies on said support surface so an axial bearing is formed which receives axial forces of generated by said drive shaft.

11. The trench wall cutter as defined in claim 10, wherein an upper, drive-side end of said drive shaft is radially supported by a connection to a motor shaft of said drive means.

* * * * *